March 4, 1969  W. A. SANZENBACHER  3,430,769
APPARATUS FOR PREPARING DRINKABLE WATER
Filed Dec. 1, 1966
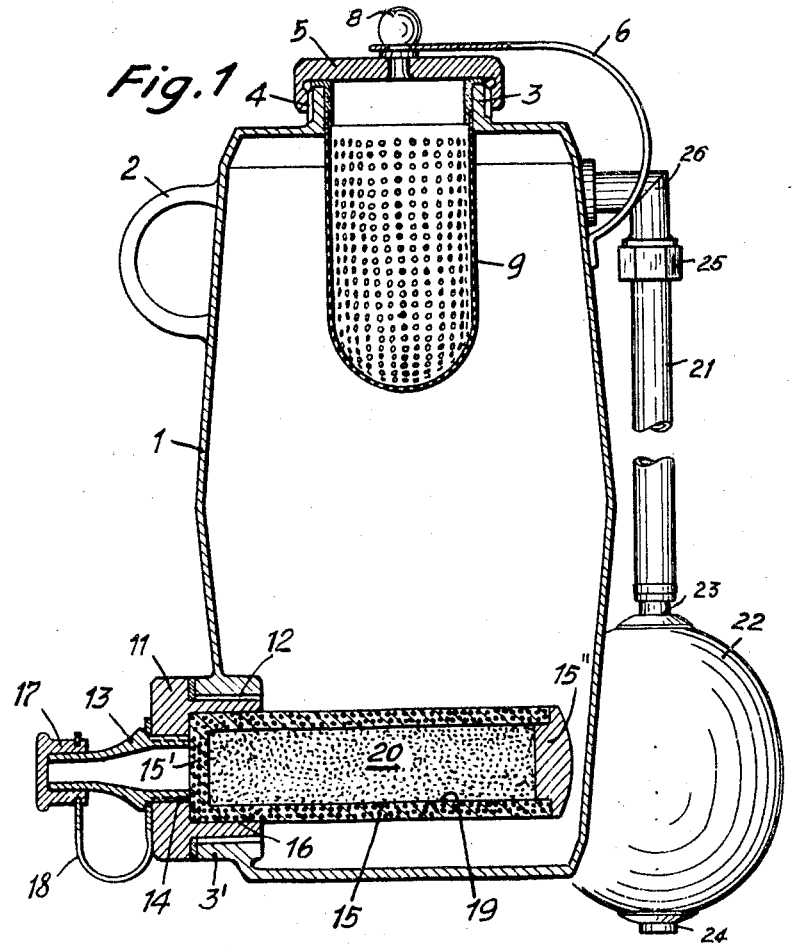
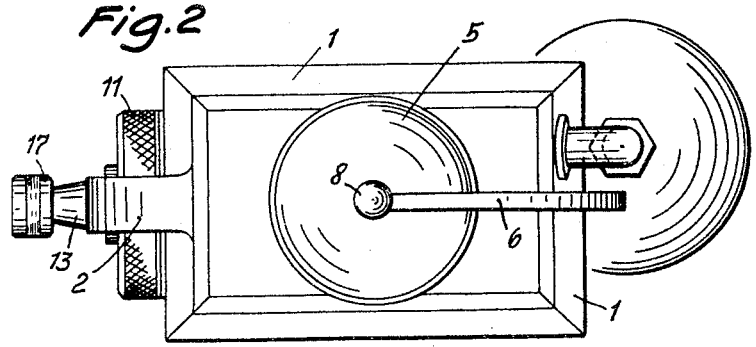
INVENTOR
WILLIAM A. SANZENBACHER
BY  Lowry & Rinehart
ATTORNEYS

United States Patent Office 3,430,769
Patented Mar. 4, 1969

3,430,769
APPARATUS FOR PREPARING DRINKABLE WATER
William A. Sanzenbacher, P.O. Box 341,
8022 Zurich, Switzerland
Filed Dec. 1, 1966, Ser. No. 598,348
U.S. Cl. 210—266      8 Claims
Int. Cl. B01d 29/00, 31/00

ABSTRACT OF THE DISCLOSURE

A water conditioning apparatus for preparing potable water comprising a container having a water inlet opening and a water outlet opening. A filter element composed of diatomaceous earth is mounted inside the container at the water outlet opening. The filter element has a wall portion and one end portion forming a hollow space. A granular, free-flowing filter material is disposed within this hollow space. The end portion of the filter element is placed so that it faces the water outlet opening. A pressure-producing means is connected to the container to force water to be treated from outside the wall portion of the element into and through the said filter material within the hollow space and finally through the end portion of the element out of the water outlet.

BACKGROUND OF THE INVENTION

The present invention relates to an improved apparatus for preparing drinkable water and is a further development of the apparatus according to Patent No. 3,392,837.

Water containers of this type and provided with a prefiltering means, have already been proposed in which a filter candle made of diatomaceous earth is disposed in a fine-grain free-flowing filtering and purifying material. The water to be prepared first contacts said material that consists of a special activated coal combined with silver and which may contain certain additives. The water then is pressurized and supplied to the filtering candle, penetrates same and runs out ready for consumption.

The water from lakes, rivers, ponds and brooks prepared with such apparatus, as well as rain and snow water treated therewith, has been sufficiently and adequately prepared and treated but has a bluish glimmer that is considered very inconvenient by consumers.

The additional apparatus disclosed by the present invention serves not only for preparing drinkable water but also for improving the appearance or looks thereof, i.e. for imparting thereto a neutral tint or tone that is identical with that of spring water. In said apparatus the granular free-flowing filter is disposed in the hollow space of the solid filter that has the form of a cartridge made of diatomaceous earth, a pump being connected to the water container for pumping the water through the filter cartridge that communicates with the regulable outlet.

A further object of the invention is the use of a mixture from 17 parts by weight of tetraglycinhydroperiodide, 24 parts by weight p-toluenesulfonamidechlorosodium, 25 parts by weight sodium citrate and 400 parts by weight sodiumcarbonate as active agent for the preparation of potable water from lakes, rivers, ponds and brooks, as well as from rain and snow water.

BRIEF DESCRIPTION OF THE DRAWINGS

One form of the invention is shown in the drawing, in which—
FIG. 1 is a section through a portable filter unit, and
FIG. 2 is a top view thereof.

DESCRIPTION OF SPECIFIC EMBODIMENT

A plastic or metal container 1 is provided with a handle 2 and a filler neck 3 as well as an outlet neck 3' close to the container bottom. On external threads 4 of filler neck 3 is sealingly screwed a cap 5 which through a flexible tape 6 is secured to container 1. 9 designates a cylindrical coarse sieve of one-millimeter mesh-width that is readily removable for cleaning purposes and through a matching edge is seated on the mouth edge of filler neck 3. Said sieve by the tightened closure nut 5 is clamped between the latter and said mouth edge, and coarse foreign matter is retained when pouring water through filler neck 3.

An outlet cap nut 11 provided with external threads 12 is screwed in outlet neck 3' of container 1 provided with internal threads. Cap 11 has a threaded bore 14 open to the outside in which is screwably engaged a discharge neck 13. Cap 11 further is provided with a bearing bore 16 open to the inside, in which is inserted a filter cartridge 15 made of diatomaceous earth. The filter cartridge has a thin wall and a wide hollow space 19. When water permeates from the outside to the inside through a filter cartridge 15, it will be fine-filtered and degerminated owing to the great many microscopically fine groves, recesses, channels and depressions provided in the diatomaceous earth where the bacteria will be trapped. Cartridge 15 on the side facing the discharge neck 13 is shut-off by the solid front wall 15', and on the opposite face by a detachable plug 15''. Discharge neck 13 on its nozzle portion carries a readily removable lock cap 17 that is secured against loss by a flexible tape 18 to neck 13. Hollow space 19 of filter cartridge 15 is filled with a pulverous or fine-grained (grain size suitably less than 2 millimeters) substance 20 that is active as purifier. The substance 20 is a mixture of 17 parts by weight of tetraglycinhydroperiodide, 24 parts by weight of p-toluenesulfoamidechlorosodium, 25 parts by weight of sodium citrate and 400 parts by weight of sodiumbicarbonate, at least about 0.233 gram of the mixture being used per liter of water. The mixture may contain further components such as silver-bonded activated charcoal or softeners. The substance 20 in the example shown is not compact but in the form of loose material stored in hollow space 19 so that it will be shaken when joggling the container.

When using the apparatus described, cap 5 is removed and the polluted water or water tainted by a more or less unpleasant odor is filled-in through neck 3. The filled-in water is prefiltered through the coarse sieve 9, passes into cartridge 15 and permeates same when discharge neck 13 is opened. The foreign particles and bacteria present in the water are retained by the filter cartridge 15. When the water then flows through a substance 20, it will be purified. After leaving the substance 20, the water passes through the end-wall 15' of filter cartridge 15 whereby the water is again filtered. The potable water finally flows through the discharge 13 to the outside to be used for drinking or cooking.

In the case of normally polluted or contaminated water, the active agent 20 suffices for preparing approximately 100 liters of water. The filter cartridge 15 also has to be cleaned from time to time in order to maintain the good filtering and purifying effect thereof. As soon as the outflow of the treated water from neck 13 is markedly slowed down, it is time to renew the active agent 20 or the filler cartridge 15.

21 is a flexible conduit comprising at its free end a pumping balloon 2 that is provided with two conventional, mutually operating valves 23, 24. Conduit 21 through a union 25 is detachably connected to an angle fitting 26 that is fixed to container 1.

After the active agent 20 has been filled into cartridge 15, the unit described is used as follows. The polluted or contaminated water that has to be made potable, is poured into the container 1 through filler neck 3. The water passes through the coarse sieve 9 before arriving in the interior of container 1. Air then is pumped into container 1 through balloon 22. Container 1 then is shaken, and then the discharge neck 13 is opened. The water in container 1, being pressurized, permeates through the peripheral wall of the filter cartridge 15 and thereby is fine-filtered and degerminated. The water then reaches the active agent 20 and permeates therethrough, whereby a purifying action is taking place, as is known per se when contacts activated charcoal and the added agents. The water thus treated or prepared then penetrates through the end-wall 15' from the inside to the outside and thereby is again fine-filtered and degerminated. The excess pressure in container 1 acts to force the water through the filter cartridge, the active agent and the end-wall 15' at a relatively rapid rate. As such excess pressure amounts to at least one atmosphere, the water is forced through the apparatus until it is discharged through neck 13.

The water flowing out from neck 13 is ready for human consumption.

The active agent 20 could contain water-softening additives. The apparatus described may be made of metal or plastic, or of a combination thereof. Obviously, some other suitable regulating member such as a rotary, tilting or sliding valve or like shutoff valve, could be mounted on the discharge neck 13. The size of the apparatus shown and described is adapted to the use contemplated therefor, and the water contents of the container for personal use will be limited to one or a few liters, so that the apparatus may be carried along with the other equipment without requiring too much space.

The active agent 20 may be applied in the form of tablets which may be added directly to the water or introduced into the container, whereupon water is poured thereon. Such tablets effervesce when contacted by water, and they disintegrate within a minute. In detailed tests it has been found that about 0.233 gram of the active agent described is required for properly degerminating one liter water. The tablets preferably are made of such size that one tablet weighs about 0.466 gram and thus suffices for degerminating two liters of water.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. A water-conditioning apparatus for preparing potable water comprising:
    (a) a container having a water inlet opening and a water outlet opening;
    (b) a filter element composed of diatomaceous earth and mounted inside said container at said outlet opening;
    (c) said element having a wall portion and one end portion forming a hollow space, said end portion facing said outlet opening detachable closing means to cover said hollow space;
    (d) a granular, free-flowing filter material disposed within said hollow space, said material consisting of a mixture comprising 17 parts by weight of tetraglycinhydroperiodide, 24 parts by weight of p-toluenesulfonamide - chlorosodium, 25 parts by weight of sodium citrate and 400 parts by weight of sodiumbicarbonate; and
    (e) a pressure-producing means connected to said container to force water to be treated from outside said wall portion into and through said filter material within said hollow space and finally through said end portion out of said water outlet.

2. An apparatus as defined in claim 1 wherein the hollow space has a much greater width than the wall thickness of the said filter element.

3. An apparatus as defined in claim 1 wherein said pressure-producing means includes a pumping balloon and a flexible conduit, said conduit is disposed between the pumping balloon and said container for producing excess pressure in said container.

4. An apparatus as defined in claim 1 in which said filter element and said free-flowing filter material are exchangeable.

5. An apparatus as defined in claim 1 wherein at least about 0.233 gram of said mixture is used at any one time.

6. An apparatus as defined in claim 1 wherein said free-flowing material further comprises a component from the group consisting of silver-bonded activated charcoal, softening additives and mixtures thereof.

7. An apparatus as defined in claim 1 wherein said water inlet includes a removable, cylindrical coarse sieve mounted across said opening to remove coarse material from the water upon entering said container.

8. An apparatus as defined in claim 7 wherein said pressure-producing means is connected to the container at a point between said water inlet opening and water outlet opening.

References Cited
UNITED STATES PATENTS

| | | | |
|---|---|---|---|
| 529,471 | 11/1894 | Arendell | 210—266 |
| 2,372,340 | 3/1945 | Senyal | 210—314 X |
| 2,672,987 | 3/1945 | Hutchinson | 210—136 |
| 2,781,312 | 2/1957 | Klumb et al. | 210—282 X |
| 3,223,619 | 12/1965 | Calmon et al. | 210—282 X |
| 3,327,859 | 6/1967 | Pall | 210—282 X |
| 2,788,128 | 4/1957 | Heine | 210—282 |
| 3,342,340 | 9/1967 | Shindell | 210—282 |

SAMIK N. ZAHARNA, *Primary Examiner.*

U.S. Cl. X.R.

210—282, 316, 416